United States Patent [19]

Saleeb et al.

[11] Patent Number: 5,028,446
[45] Date of Patent: Jul. 2, 1991

[54] PROCESS FOR MAKING CALCIUM BEVERAGES CONTAINING RAPIDLY SOLUBILIZED CALCIUM FUMARATE

[75] Inventors: Fouad Z. Saleeb, Pleasantville; Philip R. Morreale, Mt. Vernon, both of N.Y.; Randal P. McKay, Paramus, N.J.; Susan M. Vidal, Carmel, N.Y.

[73] Assignee: Kraft General Foods, Inc., Glenview, Ill.

[21] Appl. No.: 609,877

[22] Filed: Nov. 6, 1990

Related U.S. Application Data

[63] Continuation of Ser. No. 80,140, Jul. 31, 1987, abandoned.

[51] Int. Cl.$^5$ .............................................. A23L 1/30
[52] U.S. Cl. ..................................... 426/590; 426/597; 426/74; 562/595
[58] Field of Search ................. 562/595, 582; 426/590, 426/597, 74

[56] References Cited

U.S. PATENT DOCUMENTS

| | | | |
|---|---|---|---|
| 3,534,095 | 10/1970 | Fingas | 562/582 |
| 4,060,535 | 11/1977 | Cinco | 562/595 X |
| 4,397,837 | 8/1983 | Raaf et al. | 425/52 X |
| 4,737,375 | 4/1988 | Dakel et all. | 426/590 |
| 4,740,380 | 4/1988 | Melachouris et al. | 426/590 |

*Primary Examiner*—Joseph Golian
*Attorney, Agent, or Firm*—Thomas A. Marcoux; Linn I. Grim; Thomas R. Savoie

[57] ABSTRACT

The present invention is concerned with a process for preparing rapidly solubilized calcium fumarate by first preparing a slurry of fumaric acid and water and a calcium containing base, combining under high shear conditions the calcium containing base with the fumaric acid slurry under temperatures not to exceed about 160° F., quenching the reaction when at least one half of the fumaric acid is neutralized and wherein the mole ratio of the calcium to fumarate is at a mole ratio ranging from 1:2 to about 1:1, and drying the mixture.

15 Claims, No Drawings

PROCESS FOR MAKING CALCIUM BEVERAGES CONTAINING RAPIDLY SOLUBILIZED CALCIUM FUMARATE

This is a continuation of copending application Ser. No. 080,140, filed on July 31, 1987, and now abandoned.

BACKGROUND OF THE INVENTION

1. Field of the Invention

This invention relates to calcium fumarate, its process for production and uses therefore. More specifically the present invention relates to a dried calcium fumarate that is rapidly solubilized in aqueous solutions.

2. Description of the Prior Art

Among the processes that have been used for the production of metal salts or organic acid salts are the fusion processes in which a metal oxide, hydroxide, or carbonate is reacted with the apprOpriate acid at a temperature that is above the melting point of the organic acid and of the metal salt that is being formed. These fusion processes have several disadvantages that limit their use. They require the use of expensive high temperature equipment and complicated handling procedures. Long reaction periods at elevated temperatures are necessary to allow the reaction to go to completion. The yield is a discolored molten product that on cooling forms into large lumps. A grinding operation is required to convert the lumps to the fine powder that is the commercially-acceptable form of the salts. However such a product, due in part to the grinding is not readily soluble in aqueous systems.

In U.S. Pat. No. 3,476,786, Lally et al., disclosed a process for the production of metal salts that is more economical and easier to carry out than the aforementioned fusion process. Their process, which yields a dry, finely-divided product, involves grinding a metal oxide, hydroxide, or carbonate with a solid anhydrous fatty acid in the presence of a catalyst, such as anhydrous ammonium carbonate, and in the absence of water at a temperature below the melting point of the metal salt. The salt-forming reaction takes place slowly, and even after a lengthy reaction period the metal salt product contains a substantial amount of unreacted fatty acid. The calcium fumarate formed by this process does not have the solubility properties of the present invention.

Fingas, in U.S. Pat. No. 3,534,095 teaches the method of preparation of calcium fumarate by mixing calcium hydroxide and fumaric acid in dry condition. To the reactants is added 1-10 moles of water. The salt formed is non-hydroscopic with a mole ratio of 1.0:1.0, Calcium (Ca): fumarate. Further the process disclosed in Fingas is silent on the need to maintain the heat of the reaction below about 160° F.

U.S. Pat. No. 4,060,535 to Cinco discloses the preparation of a metal salts of organic acids. This process uses very little water and uses the melting point of the organic acid as the temperature range for the reaction.

SUMMARY OF THE INVENTION

The present invention relates to a process for producing and the use of calcium fumarate. The calcium fumarate formed hereunder has a generally crystalline structure and is rapidly solubilizing in aqueous systems. A rapidly solubilizing calcium fumarate is formed by maintaining the order of addition of the reactants, controlling the processing parameters and using fairly large amounts of water. It has been found that since fumaric acid is almost insoluble in water, a slurry of water and fumaric acid is first formed. To this slurry is added, under high shear conditions, a calcium containing base selected from the group consisting of calcium hydroxide ($Ca(OH)_2$), calcium carbonate ($CaCO_3$), calcium oxide ($CaO$) and combinations thereof. Processing parameters and conditions such as, the amount of water present, the rate of addition and concentrations of the reactants, temperature of the reaction, and neutralization end point monitoring are controlled to produce a calcium fumarate that has improved solubility characteristics. The reaction conditions are controlled to produce a calcium fumarate that has a generally crystalline structure. The reaction is quenched when the fumarate acid is from about one-half to fully neutralized, depending upon the use desired. The generally crystalline structure is thereafter dried.

The calcium fumarate prepared by the instant invention is generally crystalline in structure. It has further been found that in addition to the improvement in solubility, the calcium fumarate of the invention produces clear calcium fortified beverages, especially in the presence of tea. The calcium fortifying and improved solubility characteristics of the calcium fumarate of this invention are also useful in other food systems and products.

DETAILED DESCRIPTION OF THE INVENTION

The process set forth in this invention deals with the production of a rapidly soluble calcium fumarate. This is achieved by controlling reaction conditions such that a generally crystalline structure of calcium fumarate is formed. Further, it has now been found that calcium fumarate produced by the process disclosed herein performs differently in food products and systems depending upon the degree of neutralization.

It has been found that the reaction and conditions of the reaction that affect crystal growth of the calcium fumarate need to be controlled.

In the present invention a slurry of fumaric acid and water is prepared. The amount of fumaric acid in the slurry is generally from about 15% to about 50% by weight and preferably from about 20% to 40%. The remaining portion of the slurry is generally water in amounts ranging from about 85% to 50% and preferably from 80% to 60%.

The amount of water present in the slurry has a significant effect on the reaction conditions, hence, the quality of the end product. The higher levels of water utilized in the present invention prevents the formation of cement-type structure normally found in reaction systems of limited water content such as Fingas cited supra. Also, water has a higher heat capacity and better thermal conductivity than semi-solid masses of calcium fumarate. The heat generated by the reaction is then dissipated into a better heat sink and the superior thermal conductivity (vs. reactants cements) of water ensures the uniformity of the temperature throughout the reaction vessel during the mixing process. This also eliminates local pockets of overheated mass found in very viscous, unstirred system. Finally, the high water level ensures crystallization from a dilute mixture that propagates the crystal growth and perfection of the resultant calcium fumarate products, and eliminates the formation of hardened masses that produce excessive fines (<400 mesh) on further grinding.

A calcium containing base was then added to the fumaric acid slurry in amounts sufficient to partially or fully neutralize the fumaric acid slurry depending on the final product desired. In cases when the added calcium containing base is in a dry form, the concentration of the base generally ranges from about 15% to about 80% and preferably from about 30% to about 80%. The calcium containing base may be a member selected from a group consisting of $Ca(OH)_2$, $CaCO_3$ and $CaO$ or combinations thereof.

In addition to the rate of addition, the temperature, concentration of reactants and water present have an important effect on the final product produced. For instance, the temperature of the reaction must be kept below about 160° F. and preferably below 140° F. to produce the desired end product.

When the desired level of neutralization is achieved i.e. partially or fully neutralized, the reaction is quenched. The degree of neutralization is dependent upon the uses and desired characteristics of the calcium fumarate being sought. For instance, one characteristic could be to control the acidity of a final product such as a tea beverage. In this instance, the reaction pH can be monitored to determine complete neutralization, and in the case of partial neutralization, the initial weights of the reactants necessary can be determined. Typically, the reaction is quenched at neutralization of the fumaric acid from about 50% to 99% and preferably from about 70% to about 80% neutralization. The mole ratio of calcium ($Ca++$) to fumarate ($Fu--$) of the rapidly solubilized calcium fumarate of the present invention is from about 1:2 to about 1:1, while the mole ratio of calcium fumarate: water ranges from about 1:11 to about 1:35.

The reactions of the process herein described are generally depicted by the following:

|  |  | Starting material Ca:Fu |
|---|---|---|
| Half neutralization | $2H_2Fu + Ca^{++} \rightarrow 2CaHFu$ | 1:2 |
| Full neutralization | $H_2Fu + Ca^{++} \rightarrow CaFu$ | 1:1 |

The pH range for the half neutralized CaHFu is from about 3.0 to about 4.2. The fully neutralized CaFu is from about pH 4.6 to about pH 8.

After the reaction is quenched the calcium fumarate is dried. The drying means can be any of the known drying means. Such drying means can be, but is not limited to, spray drying, drum drying and oven drying, with or without vacuum. Drying conditions should be such that the generally crystalline structure is retained while the water is driven off.

The concentration of calcium fumarate after quenching generally ranges from about 20% to about 50% by weight of the mixture and preferably from 30% to about 45%.

When the calcium fumarate produced is to be used as a dry ingredient, for instance in a dry beverage mix, the reaction conditions should be such that the majority of crystalline particles of calcium fumarate are above a 400 mesh (37 microns) particle size. Preferably about 80 percent to about 90 percent of the calcium fumarate has a particle size greater than about a 400 mesh and less than about a 60 mesh (250 microns). If the particle size is smaller than about a 400 mesh the calcium fumarate tends to clump or float when added to water. If the calcium fumarate is not a crystalline structure then it is not readily soluble and tends to clump.

Use of the resultant calcium fumarate in a dry foodstuff is a good source of calcium. It is anticipated that effective amounts of calcium fumarate will be used to supply from about 10 percent to about 50 percent of the USRDA (U.S. Recommended Daily Allowance) for calcium per serving, depending upon the foodstuff or system. Such a range in an unsweetened dry beverage mix would be from about 10% to about 70% by weight. In an unsweetened gelatin mix the range for 10% to about 25% USRDA would be about 6% to about 17% by weight.

The following examples are illustrative only, and not meant to be limiting in any manner.

EXAMPLE 1

A dry partially neutralized fumaric acid calcium salt was prepared as follows. 940 g (12.7 moles) of calcium hydroxide (Mississippi Lime, 7 Alby Street, Alton, IL 62002) are suspended in 4000 g (222.2 moles) of water. 1920 g (16.55 moles) of fumaric acid (Monsanto Chemical Corp., 800 North Lindbergh, St. Louis, MO 63167) were mixed with 4000 g (222.2 moles) of water at ambient temperature. The ratio of fumaric acid to $Ca(OH)_2$ to water was 1:1.3:35. The calcium hydroxide suspension was added slowly to the fumaric acid slurry such that the temperature of the reacting mixture does not exceed 160° F. A high shear mixer (Lightning ™ Mixer) was used all the time of reaction. At the end of the neutralization step, the pH of the slurry was 3.14. The resultant suspension was then mixed further for an additional 20 minutes and then vacuum dried.

The calcium fumarate suspension was filtered using a Buckner funnel type 2000 ml, porosity C (from VWR Scientific Pyrex #30295-184) and a vacuum flask. The mixture was poured into the funnel and subjected to vacuum. The liquid portion of the mixture passed through the fritted glass disc and was later discarded while the moist calcium fumarate crystals remained on top of the fritted disc. These solids were transferred to stainless steel pans and placed in a vacuum oven. The temperature of the oven was maintained at 185° –200° F. and the vacuum at 25"–30". The sample was left to dry overnight (15–17 hrs.).

In this example a partial neutralization of fumaric acid with $Ca(OH)_2$ was achieved (~77% neutralization). The calcium fumarate salt produced was a free-flowing powder that dissolved readily in cold water to produce calcium fortified beverage drinks. Screening of the calcium fumarate showed 100% below 60 mesh and 3% below 400 mesh.

EXAMPLE 2

A full neutralized calcium fumarate sample was prepared by reacting 58 lbs of fumaric acid with 37 lb of calcium hydroxide in the presence of 222 lbs of water. The mole ratio of fumaric acid: $Ca(OH)_2$: $H_2O$ was 1:1:24.7. The fumaric acid (Pfizer, fine granular) was mixed in a large kettle with 122 lbs of water. The calcium hydroxide (Mississippi Lime) was mixed into the remaining 100 lbs of water. The calcium hydroxide slurry was added slowly to the fumaric acid suspension over a period of 30 min. with stirring. Due to the heat of reaction, the temperature of the mixture was increased from the intial value of 20° C. to a maximum of 56° C. (132° F.), but remained very close to 120° F. during most of the reaction period. The final pH of the fully neutralized calcium fumarate slurry in water was 4.95. The slurry was then dried via spray drying utilizing a two-fluid nozzle using air. The air outlet temperature of the spray tower was adjusted to 260° F. and the air inlet temperature was 430° F.

The calcium fumarate powder obtained after spray drying was a free flowing powder that readily dissolves in water to produce a calcium fortified beverage drink. Screening of the calcium fumarate powder showed the following particle size distribution.

| | |
|---|---|
| 60 mesh | 100% |
| 200 mesh | 28.6% |
| 400 mesh | 4.5% |

EXAMPLE 3

This example demonstrates the importance of establishing the maximum limit for the reaction temperature during the formation of calcium fumarate and its performance thereafter. 960 g (8.28 moles) of fumaric acid was added to 1000 g (55.56 moles) of water in a 5 liter glass beaker. 470 g (6.35 moles) of calcium hydroxide were slurried in 1000g (55.56 moles) of water and added with stirring to the fumaric acid suspension. The mole ratio of fumaric acid to $Ca(OH)_2$ to water was 1:1.3:17.5. The base addition was not controlled to keep the reaction temperature below 160° F. At about 50% of the base addition the temperature of the reactants exceeded 160° F. and at that point the whole mixture in the beaker solidified to a white very hard cement-like mass. No stirring was possible and even after cooling to ambient temperature ($\sim$70° F.) the formed hard calcium fumarate salt did not disperse back in solution. The neutralization reaction was discontinued and the sample discarded.

EXAMPLE 4

A calcium fumarate salt was prepared by mixing essentially 1 mole of fumaric acid with 1 mole of calcium hydroxide in the presence of 10 moles of water. 255 g (2.22 moles) of fumaric acid and 163 g of calcium hydroxide (2.22 moles) were dispensed separately in 200 ml of water (total water =400 g or 22.2 moles). The mole ratio of fumaric acid to $Ca(OH)_2$ to water was 1:1:10. The calcium hydroxide slurry was added slowly to the fumaric acid suspension with continuous stirring while controlling the reaction temperature to below 160° F. At about 40% base addition, the fumarate solution became thicker and thicker, behaving like a frosting. Further additions of calcium base resulted in a cement-like mass due to the high concentration of salt-to-water (1:10 mole/mole). At this point the solid mass was discarded as it is of no practical use for the product specifications of this invention.

This reaction is similar to that taught by Fingas, supra.

EXAMPLE 5

A calcium fumarate sample was prepared by combining 580 g (5 moles) of fumaric acid (Pfizer, fine granular, F.C.C.) with 1650 g (92 moles) of water and 500 g (5 moles) of calcium carbonate (Baker Reagent grade) at ambient temperature. Dry calcium carbonate was added to the fumaric acid suspension in ten equal portions of 50g, one portion every 5 min. while stirring the mixture continuously using a Lightning mixer at high speed. The mole ratio of fumaric acid to $CaCO_3$ to water was 1:1:18.4. After the final addition of calcium carbonate, the pH of the mixture was 4.95. It was found that the addition of $CaCO_3$ to the fumaric acid proceeded through an endothermic reaction, the final temperature of the reaction vessel was 17.3° C. (63° F.) while the starting solution temperature was 19.8° C. (68° F.).

The resultant fully neutralized calcium fumarate slurry was then split into two portions for drying using two different techniques; namely, oven drying after filtration and drum drying. For oven drying, the excess water of the calcium fumarate suspension was removed via filtration using a fritted glass disc. The wet calcium fumarate cake retained over the glass filter was removed and dried for 16 hrs. in a laboratory oven held at 75° C. to a final moisture of 0.6%. The dry powder was then screened through a 60 mesh (250 micron size) to break up any aggregated powder. The screened powder was found to contain only 1.5% below 40 mesh (<250 M) (15–200 mesh).

The other half of the prepared calcium fumarate suspension was dried using a pilot plant drum dryer (Blaw-Knox 12"×18" atmospheric double drum dryer) heated to 320° F. utilizing 90 psi steam. The contact time for the calcium fumarate with the hot drums was 86 seconds to produce a dry product of a moisture content of 2.1%. The sample was screened and practically all of it passed through a 50 mesh screen.

Both drying processes produced free flowing calcium fumarate powders with a calcium content of 25.8% ±0.1% that are readily soluble in cold water when incorporated in a calcium fortified dry beverage mix.

On further screening the fines content (−400 mesh) was found to be 1.5% for the oven dried sample and 19.6% by weight for the drum dried calcium fumarate.

EXAMPLE 6

Since from Example 5 we found that reacting $CaCO_3$ with fumaric acid produced an endothermic reaction as opposed to a highly exothermic reaction when $Ca(OH)_2$ is used, an equimolar mixture of $CaCO_3$ and $Ca(OH)_2$ was used to control the heat of reaction and to avoid the use of cooling systems.

A fully neutralized calcium fumarate sample was prepared by combining 580g (5 moles) of fumaric acid (Pfizer fine granular) with 1600 g (88.9 moles) of water at ambient temperature (18° C.). 250 g (2.5 moles) of $CaCO_3$ and 185 g (2.5 moles) of $Ca(OH)_2$ (Mississippi Lime) were dry blended together and added in ten equal portions to the fumaric acid slurry, a portion every 5 min. under high speed stirring. The mole ratio of fumaric acid to $Ca(OH)_2$ to water was 1:1:18. At the end of calcium base addition the final pH of the suspension was 4.9. The temperature of the reaction system when using an equimolar blend of $CaCO_3$ and $Ca(OH)_2$ to fully neutralize fumaric acid did not exceed 35° C. (96° F.), up from the 18° C. (64° F.) starting temperature. The resultant calcium fumarate sample was drum dried under the same conditions as in Example 5 to produce a free-flowing powder wherein 100% passes through a 60 mesh screen and only 19% is of a size below 400 mesh.

EXAMPLE 7

A calcium-fortified, unsweetened, dry tea beverage mix was prepared as follows:

|                         | Dry Weight     |
|-------------------------|----------------|
| Ca Fumarate (Example 6) | 53% by Weight  |
| Citric Acid             | 19% by Weight  |
| Tea Solids              | 16% by Weight  |
| Dry Tea/Lemon Flavors   | 12% by Weight  |

After blending the above ingredients, 15.5 g of this dry beverage mix was added to two quarts of ice-cold water and the desired amount of sugar and/or a low-calorie sweetener was mixed in. The calcium fumarate was readily and completely soluble and provided a good tasting lemon-flavored ice tea which is fortified with calcium to the level of 260 mg calcium per 8 oz. glass or approximately 25% of the required daily allowance (USRDA) per serving. This tea drink was very clear and did not show the usual turbidity (cloudiness) and sediment associated with cold tea beverages fortified with calcium salts other than calcium fumarate (e.g calcium lactate, or calcium phosphates).

EXAMPLE 8

A dry gelatin mix fortified with calcium, derived from a fumaric acid that was 84% neutralized with calcium hydroxide in accordance with this invention, was prepared according to the following composition:

| Calcium Fumarate (84% neutralized) | 6.7%  |
|------------------------------------|-------|
| Adipic Acid                        | 20.5% |
| Gelatin                            | 63.8% |
| Dry Flavors                        | 9.0%  |

After thorough blending of the above dry ingredients 11.2 g of the mix were added to 16 oz. of water. The resultant aqueous system was heated on a stove to almost boiling ($\sim$190° F.) to effect the complete solubilization of gelatin. Sucrose was also added to the desired sweetness. After that the hot clear gelatin solution was poured into 4 serving cups, allowed to cool at room temperature for 20 min. and then in a refrigerator for an additional 2 hr. At that point a clear gelatin gel with excellent mouth feel attributes was obtained that is fortified with 43 mg calcium/serving. The calcium fumarate also improved the gelling characteristics of gelatin without any sign of precipitation/separation.

EXAMPLE 9

A lemon/lime flavored dry beverage mixed fortified with calcium was prepared in the following ratio:

| Calcium Fumarate (Example 1) | 55% |
|------------------------------|-----|
| Citric Acid                  | 38% |
| Dry Lemon/Lime Flavors       | 7%  |

20.9 g of the above blended dry beverage were dissolved in 2 quarts of cold water ($\sim$40° F.). A non-carbohydrate dipeptide sweetener (NutraSweet®) was used to the level of 0.8 g/2 quarts All the dry ingredients were readily soluble in about 30 seconds while stirring gently with a spoon. The very clear lemon/lime flavored beverage thus obtained was good tasting with no chalky or calcium off-taste even though it contained 300 mg calcium 8 oz serving. This beverage provided 30% of the recommended USRDA for calcium per 8 oz. serving.

What we claim is:

1. A process for making clear calcium fortified beverages containing rapidly soluble crystalline calcium fumarate as the major source of calcium comprising:

preparing a water slurry of fumaric acid at a concentration of 15 to 50% and adding a calcium containing base at a concentration of 15 to 80%, wherein the calcium containing base is selected from the group consisting of ca(OH)$_2$, CaCO$_3$, CaO and combinations thereof and, further, wherein the added base is dry or in combination with water;

combining, under high shear conditions, the calcium containing base with the fumaric acid slurry under conditions such that the temperature of the reaction does not exceed about 160° F.;

quenching the reaction of from about one-half to about full neutralization of the fumaric acid such that the mole ratio of calcium to fumarate is from about 1:2 to about 1:1, and the mole ratio of calcium fumarate to water is from 1:11 to 1:35;

drying the mixture to produce calcium fumarate particles having a generally crystalline structure with a majority of particles above a 400 mesh particle size;

admixing an effective amount of calcium fumarate with a powdered instant beverage mix adapted to form a clear, aqueous beverage on reconstitution.

2. The process of claim 1 wherein the concentration of fumaric acid in the slurry of 20 to 40%.

3. The process of claim 1 wherein the concentration of the base is 30 to 80%.

4. The process of claim 1 wherein the concentration of the calcium fumarate after quenching is 20 to 50%.

5. The process of claim 1 wherein the calcium containing base is Ca(OH)$_2$.

6. The process of claim 1 wherein the calcium containing base is CaCO$_3$.

7. The process of claim 1 wherein the temperature of the reaction is below or about 130° F.

8. The process of claim 1 wherein the mixture, after quenching, is spray dried.

9. The process of claim 1 wherein the mixture, after quenching, is drum dried.

10. The process of claim 1 wherein the mixture, after quenching, is oven dried.

11. The process of claim 1 wherein the mixture, after quenching, is freeze dried.

12. The process of claim 1 wherein the reactants are fully neutralized and the reaction is quenched at from about pH 4.6 to about 8.

13. The process of claim 1 wherein the reaction is quenched at partial neutralization of the fumaric acid from about 50% to about 99%.

14. The process of claim 1 wherein the reaction is quenched at partial neutralization of the fumaric acid from about 70% to about 80%.

15. The process of claim 1 wherein 80 to 90% of the dried calcium fumarate particles have a mesh size between 400 and 60 mesh.

* * * * *